US012761424B2

(12) United States Patent
Morishima

(10) Patent No.: US 12,761,424 B2
(45) Date of Patent: Oct. 13, 2026

(54) OPTICAL CONNECTION COMPONENT

(71) Applicant: SUMITOMO ELECTRIC INDUSTRIES, LTD., Osaka (JP)

(72) Inventor: Tetsu Morishima, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 228 days.

(21) Appl. No.: 18/681,975

(22) PCT Filed: Aug. 16, 2022

(86) PCT No.: PCT/JP2022/030963
§ 371 (c)(1),
(2) Date: Feb. 7, 2024

(87) PCT Pub. No.: WO2023/053754
PCT Pub. Date: Apr. 6, 2023

(65) Prior Publication Data

US 2025/0123446 A1 Apr. 17, 2025

(30) Foreign Application Priority Data

Sep. 30, 2021 (JP) ................................ 2021-161591

(51) Int. Cl.
*G02B 6/38* (2006.01)

(52) U.S. Cl.
CPC ......... *G02B 6/3874* (2013.01); *G02B 6/3825* (2013.01); *G02B 6/3843* (2013.01); *G02B 6/3897* (2013.01)

(58) Field of Classification Search
CPC ... G02B 6/3897; G02B 6/3871; G02B 6/3843
See application file for complete search history.

(56) References Cited

U.S. PATENT DOCUMENTS 5,661,843 A 8/1997 Rickenbach et al.
6,085,003 A 7/2000 Knight
(Continued)

FOREIGN PATENT DOCUMENTS

CN 212623208 U 2/2021
JP H07-56053 A 3/1995
(Continued)

OTHER PUBLICATIONS

Oct. 25, 2022 International Search Report issued in International Patent Application No. PCT/JP2022/030963.
(Continued)

*Primary Examiner* — Eric Wong
(74) *Attorney, Agent, or Firm* — Oliff PLC

(57) ABSTRACT

An optical connection component enables rotational positioning of a ferrule while avoiding complication of a structure, and includes an optical connector and an adapter. The optical connector includes an optical fiber, a ferrule assembly having a ferrule and a holding portion with a flange, a housing, and an elastic member, and the adapter includes an alignment sleeve. In a state in which the optical connector and the adapter are not engaged with each other, the flange is biased by the elastic member to be rotatable about the ferrule's a central axis. In an axis misalignment state in which the ferrule's front end portion and the alignment sleeve are in contact with each other and the ferrule's outer peripheral surface is in contact with the housing's flat surface, the flange is biased by the elastic member.

11 Claims, 6 Drawing Sheets

(56) References Cited

U.S. PATENT DOCUMENTS

| | | | | |
|---|---|---|---|---|
| 2003/0215191 | A1* | 11/2003 | Taira .................... | G02B 6/3821 385/78 |
| 2009/0052844 | A1 | 2/2009 | Van Der Steen | |
| 2011/0075972 | A1 | 3/2011 | Parkman, III | |
| 2019/0004254 | A1* | 1/2019 | Yoshino ............... | G02B 6/3897 |
| 2020/0166715 | A1* | 5/2020 | Shimakawa ......... | G02B 6/3821 |
| 2021/0041637 | A1 | 2/2021 | Morishima | |
| 2025/0130374 | A1* | 4/2025 | Kirkpatrick .......... | G02B 6/3821 |

FOREIGN PATENT DOCUMENTS

| | | | |
|---|---|---|---|
| JP | 2003-329882 | A | 11/2003 |
| JP | 2008-151955 | A | 7/2008 |
| JP | 2011-039162 | A | 2/2011 |
| WO | 2018/180898 | A1 | 10/2018 |
| WO | 2019/044079 | A1 | 3/2019 |
| WO | 2020/145011 | A1 | 7/2020 |

OTHER PUBLICATIONS

Sakaime et al., "MU-Type Multi-core fiber connector", 2012 The Institute of Electronics, Information and Communication Engineers (2012 IEICE) Communication Society Conference, B-13-9, Sep. 11-14, 2012, pp. 308.

Nagase et al., "MU-Type Multi-core fiber connector", Proceedings of the 61st International Wire & Cable Symposium Conference (61st IWCS), Nov. 11-14, 2012, pp. 823-p. 827.

Jan. 15, 2026 Office Action issued in U.S. Appl. No. 18/698,915.

* cited by examiner

OPTICAL CONNECTION COMPONENT

TECHNICAL FIELD

The present disclosure relates to an optical connection component.

This application is based upon and claims the benefit of priority from Japanese Patent Application No. 2021-161591, filed on Sep. 30, 2021, the entire contents of which are incorporated herein by reference.

BACKGROUND ART

Non-Patent Document 1 discloses an optical connector that employs an Oldham coupling structure in order to simultaneously realize a floating structure and a rotation inhibiting structure of a ferrule. The floating structure is a structure in which an installation position of internal components including a ferrule can be changed by pushing the ferrule into a connector housing. The rotation inhibiting structure is a structure that restricts rotation of a ferrule about the central axis of the ferrule with respect to a connector housing. In addition, the Oldham coupling structure, which simultaneously realizes the floating structure and the rotation inhibiting structure, is a structure in which a coupling member is interposed between a flange to which the ferrule is attached and the connector housing, and a clearance is provided between the connector housing and the coupling member to give the coupling member a degree of freedom in a longitudinal direction, and on the other hand, a clearance is provided between the connector housing and the flange to give the ferrule a degree of freedom in a lateral direction.

CITATION LIST

Patent Literature

[Non-Patent Document 1] 2012 The Institute of Electronics, Information and Communication Engineers (2012 IEICE) Communication Society Conference "MU-Type Multi-core fiber connector," B-13-9, p. 308 (2012/9/11-14)

SUMMARY OF INVENTION

An optical connection component of the present disclosure includes an optical connector and an adapter. The optical connector includes an optical fiber, a front end portion, a rear end portion located on a side opposite to the front end portion, a ferrule assembly, a housing, and an elastic member. The adapter has an opening that accommodates the front end portion of the optical connector, an alignment sleeve, and a sleeve holder that holds the alignment sleeve in a predetermined position. In the optical connector, the optical fiber includes a glass fiber and a resin coating which covers the glass fiber. The ferrule assembly includes a ferrule and a holding portion. The ferrule is fixed to a tip end portion of the glass fiber exposed from the resin coating of the optical fiber. A rear end portion of the ferrule is fixed to the holding portion, and the holding portion is provided with a flange. The housing has an inner wall surface, a flat surface, and a positioning portion. The inner wall surface defines an internal space in which at least the holding portion of the ferrule assembly is accommodated. The flat surface constitutes a part of the inner wall surface and is provided at a position facing a part of an outer peripheral surface of the flange. The positioning portion limits movement of the holding portion within the internal space. The elastic member biases the flange toward the positioning portion. Particularly, in the optical connection component of the present disclosure, in a state in which a front end portion of the ferrule and the alignment sleeve or the sleeve holder in the adapter are not in contact with each other, the flange is biased toward the positioning portion to be rotatable about a first central axis of the ferrule. Further, in an axis misalignment state in which the front end portion of the ferrule and the alignment sleeve or the sleeve holder in the adapter are in contact with each other and the outer peripheral surface of the flange is in contact with the flat surface, the flange is biased toward the positioning portion.

DESCRIPTION OF EMBODIMENTS

Figure 1:
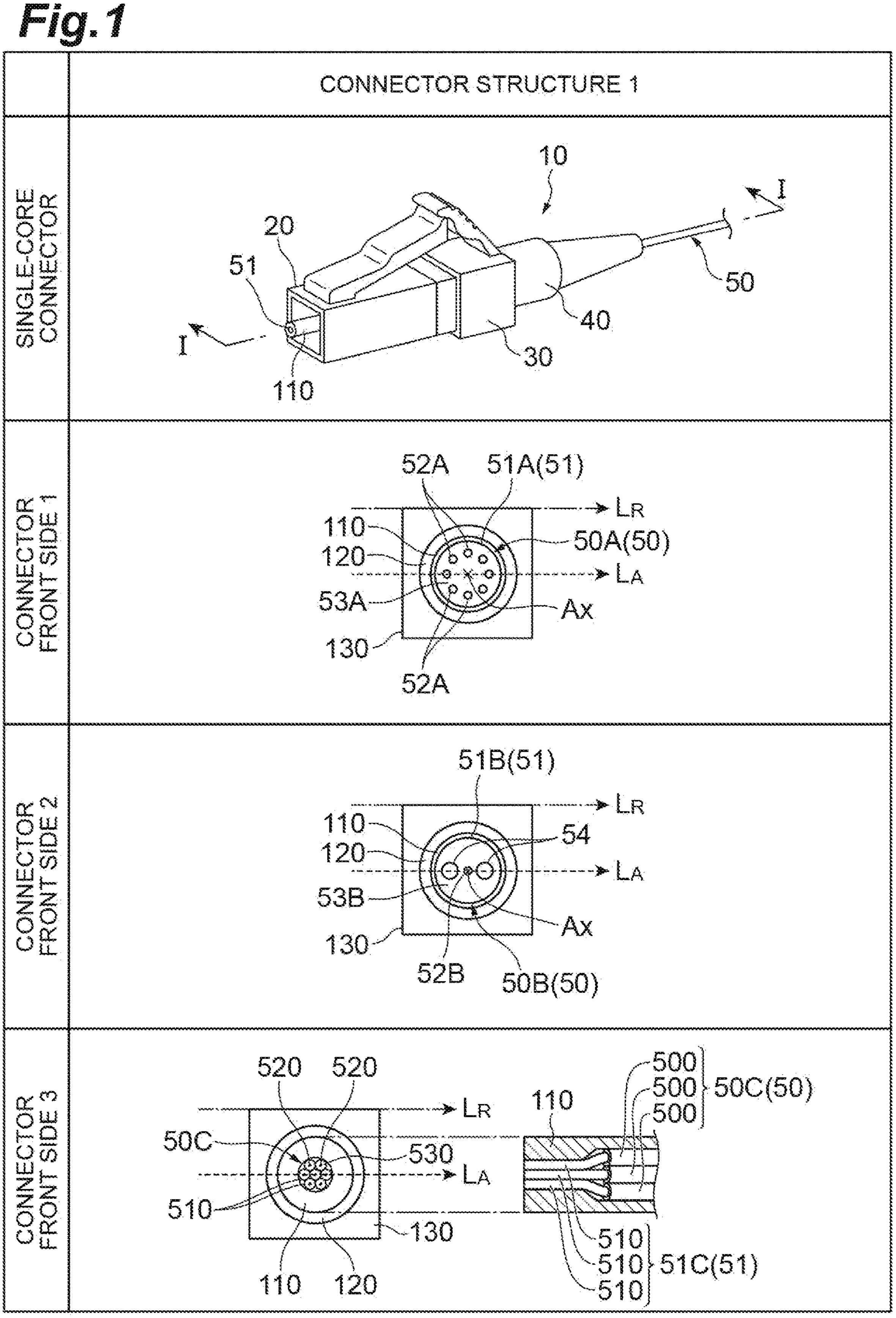
FIG. 1 is a view for explaining a schematic structure of an optical connector that constitutes a part of an optical connection component of the present disclosure.

Problems to be Solved by the Present Disclosure

As a result of examining the above-described prior art, the inventors discovered the following problems. That is, in manufacturing the optical connection components, since the number of components increases as complication of a structure increases, it is necessary to suppress the increase in component cost or processing cost. In particular, in order to realize the Oldham coupling structure as disclosed in Non-Patent Document 1, since it is necessary to utilize the clearances between a plurality of components including the flange, the above-described increase in component cost or processing cost is inevitable due to the increased complication of the structure.

The present disclosure has been made to solve the problems described above, and an object of the present disclosure is to provide an optical connection component having a structure for realizing rotational positioning of a ferrule accommodated in an optical connector while avoiding complication of the structure.

Effects of the Present Disclosure

According to the present disclosure, it is possible to rotationally position the ferrule while avoiding the complication of the structure.

Description of Embodiments of the Present Disclosure

First, the content of embodiments of the present disclosure will be individually listed and described.

Regarding the optical connection component of the present disclosure, (1) it includes an optical connector and an adapter. The optical connector includes an optical fiber, a front end portion, a rear end portion located on a side opposite to the front end portion, a ferrule assembly, a housing, and an elastic member. The adapter has an opening that accommodates the front end portion of the optical connector, an alignment sleeve, and a sleeve holder that holds the alignment sleeve in a predetermined position.

In the optical connector, the optical fiber includes a glass fiber and a resin coating which covers the glass fiber. The ferrule assembly includes a ferrule and a holding portion. The ferrule is fixed to a tip end portion of the glass fiber exposed from the resin coating of the optical fiber. A rear end portion of the ferrule is fixed to the holding portion, and the holding portion is provided with a flange. The housing has an inner wall surface, a flat surface, and a positioning portion. The inner wall surface defines an internal space in which at least the holding portion of the ferrule assembly is accommodated. The flat surface constitutes a part of the inner wall surface and is provided at a position facing a part of an outer peripheral surface of the flange. The positioning portion limits movement of the holding portion within the internal space. The elastic member biases the flange toward the positioning portion.

Particularly, in the optical connection component of the present disclosure, in a state in which a front end portion of the ferrule and the alignment sleeve or the sleeve holder in the adapter are not in contact with each other, the flange is biased toward the positioning portion to be rotatable about a first central axis of the ferrule. Further, in an axis misalignment state in which the front end portion of the ferrule and the alignment sleeve or the sleeve holder in the adapter are in contact with each other and the outer peripheral surface of the flange is in contact with the flat surface, the flange is biased toward the positioning portion.

When the ferrule assembly, especially the flange, rotates with respect to the housing, it causes angle misalignment in the rotational direction of the multi-core optical fiber or the like. According to the present disclosure, when the optical connector is mounted to the adapter in a state in which the central axis of the biased ferrule assembly and the central axis of the alignment sleeve or the sleeve holder do not coincide with each other, the rear end portion of the ferrule assembly is swung toward the inner wall surface of the housing by the vertical component of the frictional force applied to the ferrule in contact with the alignment sleeve or the sleeve holder in the adapter. At this time, rotational positioning of the ferrule is achieved by the outer peripheral surface of the flange and the flat surface of the housing coming into contact with each other. When the optical connector and the mating optical connector are connected to each other, the ferrule assembly moves back from the front end portion of the housing toward the rear end portion thereof, and thus the rotational positioning state is released and the floating structure of the entire ferrule assembly is realized. At this time, the ferrule assembly is free from the external force.

(2) In the above-mentioned (1), the optical connector has a floating structure, and in the floating structure, an installation position of the ferrule assembly in the housing changes as the ferrule is pushed from the front end portion toward the rear end portion of the optical connector.

(3) In the above-mentioned (1) or (2), an outer shape of the flange of the holding portion may be quadrangular when the flange is viewed from the front end portion toward the rear end portion of the optical connector. In this specification, a "quadrangle" is a type of polygon that is a part of a plane surrounded by four straight lines on a plane. In this case, the contact state between a part of the outer peripheral surface of the flange and the flat surface is stabilized, and thus the rotation of the entire ferrule assembly about a first central axis of the ferrule is effectively suppressed.

(4) In the above-mentioned (3), the outer shape of the flange may have a D-shaped structure in which a pair of corners with at least one of opposing sides interposed therebetween are curved. Also in this case, the contact state between a part of the outer peripheral surface of the flange and the flat surface is stabilized, and thus the rotation of the entire ferrule assembly about a first central axis of the ferrule is effectively suppressed.

(5) In the above-mentioned (1) to (4), the optical fiber to which the optical connector is attached at the tip end portion thereof may be any one of a multi-core optical fiber, a polarization-maintaining optical fiber, and a bundle fiber. The optical connector has a structure in which rotation of the ferrule assembly whose main parts are accommodated in the housing can be suppressed. For this reason, highly accurate positioning is possible for optical fibers that require positioning in the rotational direction, and as a result, the optical fiber connection with low loss is realized.

(6) In any one of the above-mentioned (1) to (5), a material of the housing of the optical connector may be a resin. By selecting a resin material as the material for the housing, it is possible to rotationally position the ferrule using a change of the installation state of the flange and deformation of the housing. That is, with the change of the installation state of the flange and the deformation of the housing, it is possible to intentionally realize a state in which the central axis of the biased ferrule assembly does not coincide with the central axis of the sleeve or the sleeve holder.

(7) In any one of the above-mentioned (1) to (6), a material of the flange of the holding portion may be a metal. The outer peripheral surface (the flat surface) of the flange is less likely to change due to housing deformation or the like, and thus the accuracy of rotational positioning is improved.

(8) In any one of the above-mentioned (1) to (6), a material of the flange of the holding portion may be a resin. In this case, damage caused by the flange colliding with the housing due to the mounting and demounting of the optical connector to and from the adapter is small, and thus the deterioration of a rotational positioning function is effectively suppressed.

Regarding the optical connection component of the present disclosure, (9) it includes an optical connector and an adapter. The optical connector has an optical fiber, a ferrule assembly, a housing, and an elastic member. The adapter has an opening, an alignment sleeve, and a sleeve holder. The optical connector further includes a front end portion and a rear end portion located on a side opposite to the front end portion. The optical fiber includes a glass fiber and a resin coating which covers the glass fiber. The ferrule assembly includes a ferrule fixed to a tip end portion of the glass fiber exposed from the resin coating and a holding portion to which a rear end portion of the ferrule is fixed and which is provided with a flange. The housing includes an inner wall surface that defines an internal space in which the holding portion is accommodated, a flat surface that constitutes a part of the inner wall surface and is provided at a position facing a part of an outer peripheral surface of the flange, and a positioning portion for limiting movement of the holding portion in the internal space. The elastic member biases the flange toward the positioning portion. The opening accommodates the front end portion of the optical connector. The sleeve holder holds the alignment sleeve in a predetermined position. Particularly, in the optical connection component of the present disclosure, in a state in which a front end portion of the ferrule and the alignment sleeve or the sleeve holder in the adapter are not in contact with each other, the flange is biased toward the positioning portion to be rotatable about a first central axis of the ferrule.

Regarding the optical connection component of the present disclosure,

(10) it includes an optical connector and an adapter. The optical connector has an optical fiber, a ferrule assembly, a housing, and an elastic member. The adapter has an opening, an alignment sleeve, and a sleeve holder. The optical connector further includes a front end portion and a rear end portion located on a side opposite to the front end portion. The optical fiber includes a glass fiber and a resin coating which covers the glass fiber. The ferrule assembly includes a ferrule fixed to a tip end portion of the glass fiber exposed from the resin coating and a holding portion to which a rear end portion of the ferrule is fixed and which is provided with a flange. The housing includes an inner wall surface that defines an internal space in which the holding portion is accommodated, a flat surface that constitutes a part of the inner wall surface and is provided at a position facing a part of an outer peripheral surface of the flange, and a positioning portion for limiting movement of the holding portion in the internal space. The elastic member biases the flange toward the positioning portion. The opening accommodates the front end portion of the optical connector. The sleeve holder holds the alignment sleeve in a predetermined position. In an axis misalignment state in which the front end portion of the ferrule and the alignment sleeve or the sleeve holder in the adapter are in contact with each other and the outer peripheral surface of the flange is in contact with the flat surface, the flange is biased toward the positioning portion.

Details of Embodiments of the Present Disclosure

Hereinafter, a specific structure of the optical connection component according to the present disclosure will be described in detail with reference to the accompanying drawings. The present invention is not limited to these examples, but is defined by the scope of the claims, and is intended to include meanings equivalent to the scope of the claims and all modifications within the scope. In addition, the same elements will be denoted by the same reference signs in the description of the drawings, and duplicate description will be omitted.

FIG. 1 is a view for explaining a schematic structure of an optical connector that constitutes a part of the optical connection component of the present disclosure. Specifically, an uppermost (indicated as "single-core connector" in FIG. 1) shows an example of an appearance of a push-pull type optical connector 10 as an example of the optical connector that constitutes a part of the optical connection component of the present disclosure. A second part (indicated as "connector front side 1" in FIG. 1) shows a front view of the optical connector 10 including an end surface of a multi-core optical fiber (MCF) 50A as an example of an optical fiber 50 to which a ferrule 110 is attached and which needs to be aligned. A third part (indicated as "connector front side 2" in FIG. 1) shows a front view of the optical connector 10 including an end surface of a polarization-maintaining optical fiber (PMF) 50B as another example of the optical fiber 50 to which the ferrule 110 is attached. A lowermost part (indicated as "connector front side 3" in FIG. 1) shows a front view and a cross-sectional view of a bundle fiber 50C in which a plurality of single-core optical fibers are bundled.

Figure 2:
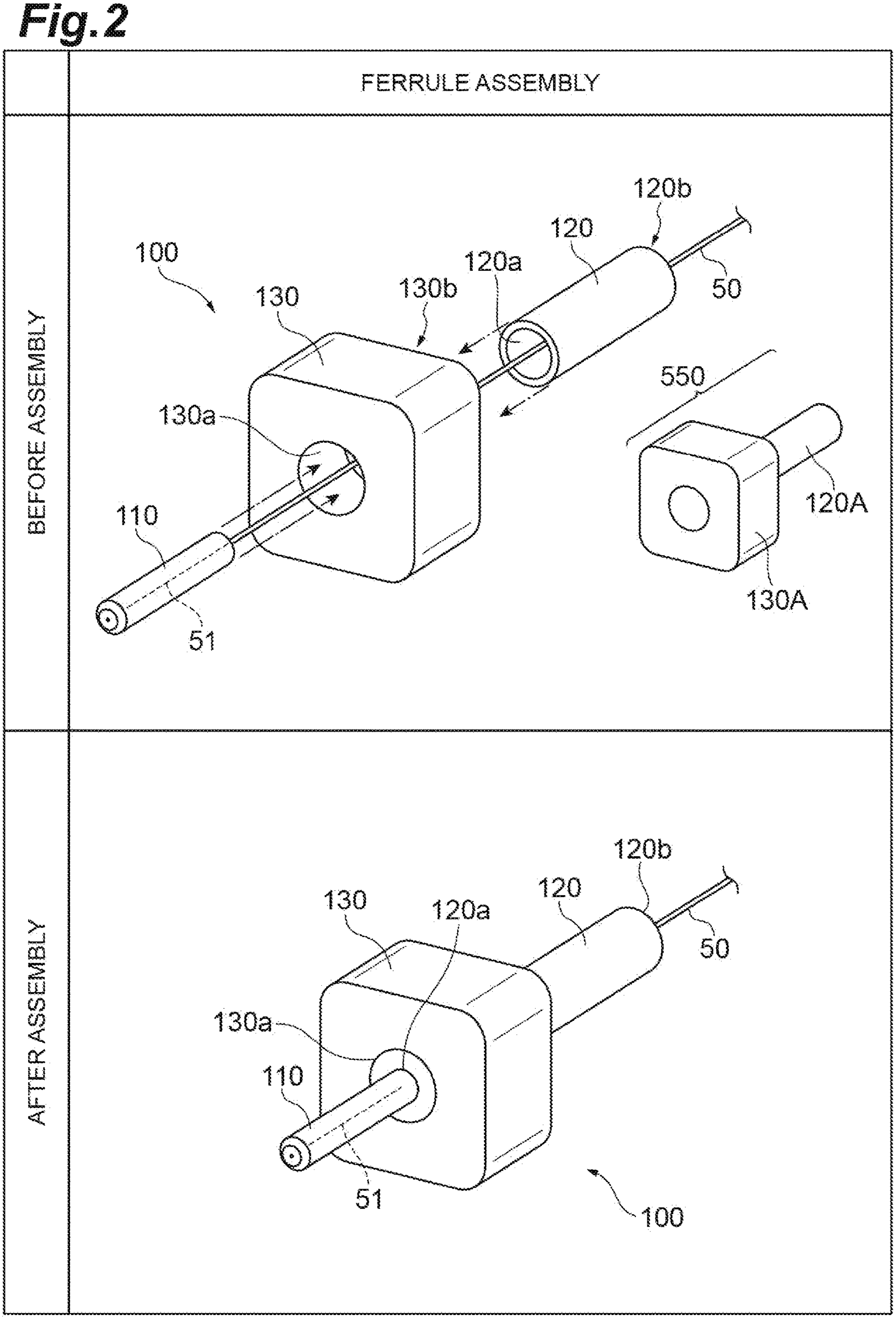
FIG. 2 is a view for explaining various structures of a ferrule assembly applicable to the optical connector shown in FIG. 1.

A housing of the optical connector 10 shown in the uppermost part of FIG. 1 is constituted by a front housing 20 and a rear housing 30. A ferrule assembly 100 including the ferrule 110 and an elastic member (for example, a spring material) for stably maintaining an accommodated position of the ferrule assembly 100 are accommodated in this housing. The ferrule 110 is attached to a glass fiber 51 which corresponds to the tip end portion including the end surface of the optical fiber 50 and from which a resin coating has been removed, and a boot 40 for protecting the optical fiber 50 extending from the rear housing 30 is attached to the rear housing 30. As shown in FIG. 2, the ferrule assembly 100 includes the ferrule 110 that is attached to the tip end portion of the glass fiber 51 from which the resin coating has been removed and a holding portion that is constituted by a flange 130 and a sleeve 120, and the rear end portion of the ferrule is inserted into the sleeve 120.

The front view of the optical connector 10 shown in the second part of FIG. 1 (connector front side 1) shows the end surface of the MCF 50A as the optical fiber 50 that needs to be aligned, the ferrule 110 attached to a glass fiber 51A which is the tip end portion of the MCF 50A, the sleeve 120 into which the ferrule 110 is inserted, and the flange 130. The MCF 50A includes a plurality of cores 52A each extending along a fiber axis AX that coincides with the central axis of the MCF 50A and a common cladding 53A surrounding each of the plurality of cores 52A. A line $L_A$ indicates a direction at a rotation angle of 0°, which is a reference direction for rotational alignment of the MCF 50A. A Line $L_R$ indicates an installation reference line of the ferrule assembly 100 along an edge of the flange 130. In the ferrule assembly 100 including the aligned MCF 50A, the line $L_A$ and the line $L_R$ are parallel to each other.

The front view of the optical connector 10 shown in the third part of FIG. 1 (connector front side 2) shows the end surface of the PMF 50B as the optical fiber 50 that needs to be aligned, the ferrule 110 attached to a glass fiber 51B which is the tip end portion of the PMF 50B, the sleeve 120 into which the ferrule 110 is inserted, and the flange 130.

The PMF 50B includes a core 52B extending along the fiber axis AX that coincides with the central axis of the PMF 50B, stress applying portions 54 disposed to have the core 52B interposed therebetween, and a common cladding 53B surrounding each of the core 52B and the stress applying portions 54. In the ferrule assembly 100 including the aligned PMF 50B, the line $L_A$ and the line $L_R$ are parallel to each other.

The front view of the optical connector 10 shown in the lowermost part of FIG. 1 (connector front side 3) shows the end surface of the bundle fiber 50C as the optical fiber 50 that needs to be aligned, the ferrule 110 to which the tip end portions of a plurality of single-core optical fibers 500 constituting the bundle fiber 50C are integrally attached, the sleeve 120 into which the ferrule 110 is inserted, and the flange 130. Each of the plurality of single-core optical fibers 500 is constituted by a glass fiber 510 and a resin coating, and each glass fiber 510 includes a core 520 and a cladding 530. The glass fibers 510 bundled by the ferrule 110 constitute a glass fiber 51C. Further, the arrangement of the core 520 in a state in which the plurality of glass fibers 510 are bundled substantially corresponds to the core arrangement of the MCF 50A described above. In the ferrule assembly 100 including the aligned bundle fiber 50C, the line $L_A$ and the line $L_R$ are parallel to each other.

FIG. 2 is a view for explaining various structures of the ferrule assembly applicable to the optical connector shown in FIG. 1. An upper part of FIG. 2 (indicated as "before assembly" in FIG. 2) shows an example in which the holding portion for fixing the rear end portion of the ferrule 110 thereto is constituted by the flange 130 and the sleeve 120 and an integrated holding portion 550 in which a flange portion 130A and a sleeve portion 120A are formed integrally with each other. Further, a lower part of FIG. 2 (indicated as "after assembly" in FIG. 2), shows an example in which the rear end portion of the ferrule 110 is fixed by the holding portion constituted by the flange 130 and the sleeve 120.

As shown in the upper part of FIG. 2, the ferrule 110 is attached to the tip end portion of the glass fiber 51 of the optical fiber 50 from which the resin coating has been removed. The flange 130 is provided with a through hole though which a front flange opening 130*a* and a rear flange opening 130*b* communicate with each other, and the sleeve 120 is also provided with a through hole through which a front sleeve opening 120*a* and a rear sleeve opening 120*b* communicate with each other. In a state in which the optical fiber 50 passes through the through hole of the flange 130 and the through hole of the sleeve 120, the sleeve 120 is inserted into the through hole of the flange 130 from the rear flange opening 130*b* toward the front flange opening 130*a,* and thus the holding portion is formed. The rear end portion of the ferrule 110 is inserted into the front sleeve opening 120*a* of the sleeve 120 mounted to the flange 130. As a result, the ferrule is fixed. Through the above processes, the ferrule assembly 100 shown in the lower part of FIG. 2 is obtained.

The integrated holding portion 550 has the flange portion 130A corresponding to the flange 130 and the sleeve portion 120A corresponding to the sleeve 120. The flange 130 may have an outer peripheral surface that is at least partially flat. The same applies to the flange portion 130A of the integrated holding portion 550. Therefore, the shape of the end surface of the flange 130 where the front flange opening 130*a* and the rear flange opening 130*b* are located may be either quadrangular or triangular. Further, in a case where the end surface shape of the flange 130 is quadrangular, the end surface shape of the flange 130 also includes a D-shaped structure in which a pair of corners with at least one of opposing sides interposed are curved. In a case where such an end surface shape is adopted, the contact state between a part of the outer peripheral surface of the flange and a flat surface provided on an inner wall surface of the housing is stabilized, and thus it can be expected to suppress the rotation of the entire ferrule assembly about a first central axis of the ferrule.

Further, the material of the flange 130 or the flange portion of the integrated holding portion 550 may be a metal or a resin. In a case where a metal flange is employed, the flat outer peripheral surface of the flange is less likely to change due to housing deformation or the like, and thus it can be expected to improve the accuracy of rotational positioning. Furthermore, in a case where a resin flange is employed, damage caused by the flange colliding with the housing due to the mounting and demounting of the optical connector to and from an adapter is small, and thus it can be expected to suppress the deterioration of a rotational positioning function.

The optical connection component of the present disclosure includes an optical connector 10 installed with the optical fiber 50 that requires rotational positioning of the fiber end surface during optical connection, such as the MCF 50A, the PMF 50B, and the bundle fiber 50C described above. The requirements for an optical connector that realizes a stable optical connection with low connection loss include a first requirement and a second requirement. The first requirement is to rotationally position the ferrule when the optical connector is mounted to the adapter. The second requirement is to realize a floating state in which no external force is transmitted to the ferrule. In response to these two requirements, the example shown in the above-described Non-Patent Document 1 realizes a rotation suppression structure and a floating structure of the ferrule by increasing the number of components from a standard optical connector and by strictly controlling the fabrication accuracy of the components. For this reason, in the case of the example shown in the above-described Non-Patent Document 1, there was a problem that processing cost and the like increased as the structure became more complicated. In contrast, the optical connection component of the present disclosure makes it possible to realize both the rotation suppression structure and the floating structure of the ferrule with a simple structure. Hereinafter, an LC type connector will be described as an example of the optical connector 10.

Figure 3:
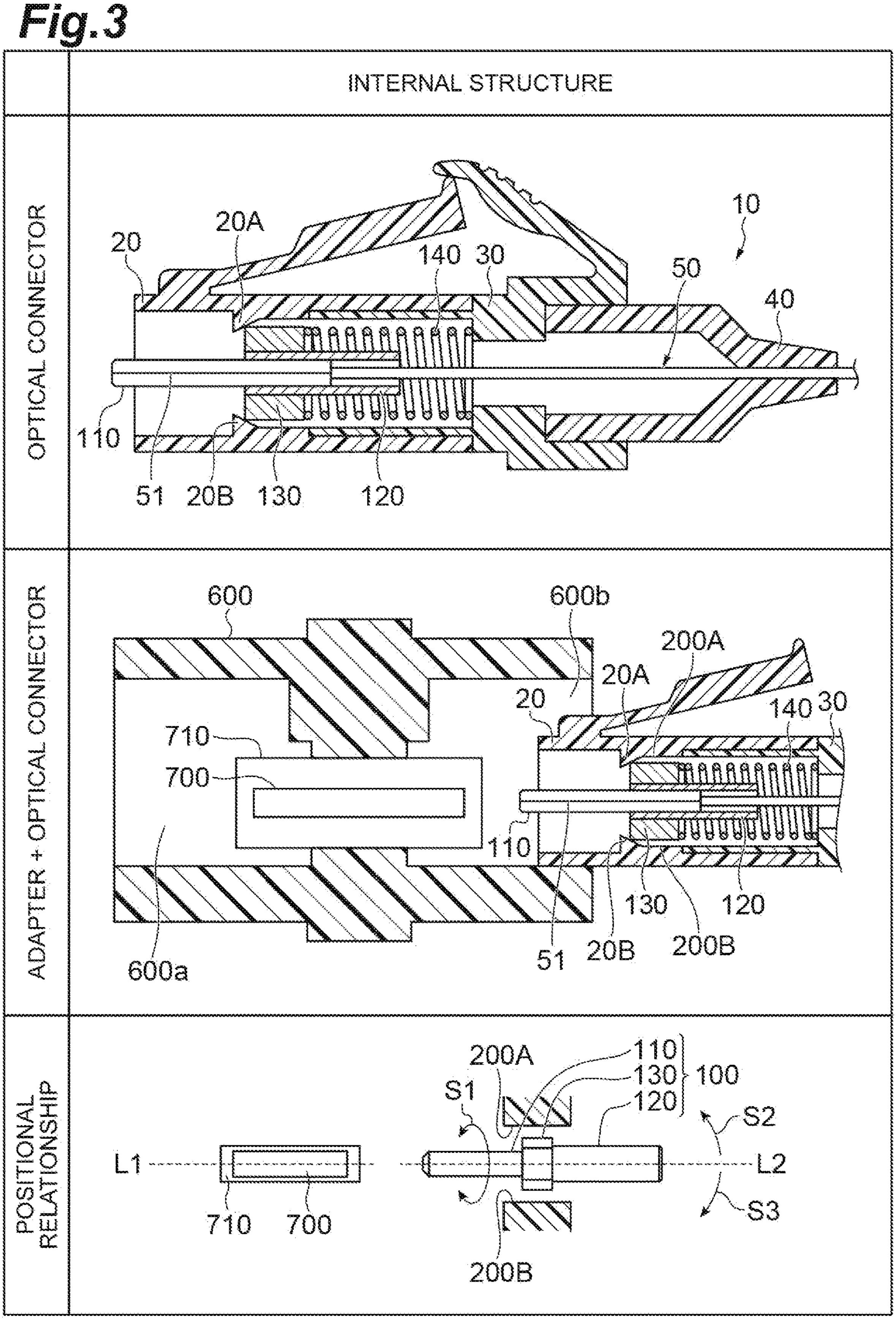
FIG. 3 is a view for explaining a cross-sectional structure of each part of the optical connection component of the present disclosure and a positional relationship between the ferrule assembly and an alignment sleeve accommodated inside the optical component.

FIG. 3 is a view for explaining a cross-sectional structure (indicated as "internal structure" in FIG. 3) of each part of the optical connection component of the present disclosure and a positional relationship between the ferrule assembly and an alignment sleeve accommodated inside the optical component. Specifically, an upper part of FIG. 3 (indicated as "optical connector" in FIG. 3) is a cross-sectional view of the optical connector 10 along line I-I shown in the uppermost part of FIG. 1. A middle part of FIG. 3 (indicated as "adapter+optical connector" in FIG. 3) shows a state immediately after the front end portion of the optical connector 10 is inserted into one opening of the adapter, that is, a state immediately before the ferrule is inserted into the alignment sleeve. A lower part of FIG. 3 (indicated as "positional relationship" in FIG. 3) shows the positional relationship between the alignment sleeve and the ferrule assembly immediately before insertion.

As shown in the upper part and the middle part of FIG. 3, the optical connector 10 has a structure that is mounted to an adapter 600 by the ferrule 110 being inserted into an alignment sleeve 700 within the adapter 600. The optical connector 10 has the housing for stably accommodating the ferrule assembly 100 attached to the tip end portion of the optical fiber 50. The material of the housing may be a resin. By selecting a resin material as the material for the housing, it is possible to rotationally position the ferrule using a change of the installation state of the flange and deformation of the housing. That is, with the change of the installation state of the flange and the deformation of the housing, it is possible to intentionally realize a state in which the central axis of the biased ferrule assembly does not coincide with the central axis of the alignment sleeve 700 or the sleeve holder 710.

The housing of this optical connector 10 is constituted by the front housing 20 and the rear housing 30 fitted into the front housing 20. The boot 40 is fixed to the rear housing 30 in a state in which the optical fiber 50 passes therethrough. A tip end of the ferrule 110 that forms a part of the ferrule assembly 100 protrudes from a front opening of the front housing 20. Further, the inner wall surface of the front housing 20 is provided with positioning portions 20A and 20B provided with inclined surfaces with which the edge of the flange 130 of the ferrule assembly 100 to be accommodated comes into contact. Furthermore, the inner wall surface of the front housing 20 is provided with flat surfaces 200A and 200B with which the outer peripheral surface of the flange 130 comes into contact during the mounting operation of the optical connector 10 to the adapter 600. That is, before the optical connector 10 is mounted to the adapter 600, gaps exist between the outer peripheral surface of the flange 130 and the flat surface 200A, and between the flange 130 and the flat surface 200B.

On the other hand, a spring material 140 that is an elastic member is accommodated inside the rear housing 30. When the rear housing 30 is inserted into the front housing 20 from behind the front housing 20, the spring material 140 is compressed by being sandwiched between the ferrule assembly 100 accommodated in the front housing 20 and the rear portion of the rear housing 30. A through hole for pulling out the optical fiber 50 is provided at the rear portion of the rear housing 30. At this time, the ferrule assembly 100 receives an elastic force from the spring material 140, which is a restoring force of the spring material 140, and the flange 130 becomes biased. That is, the edge of the end surface of the flange 130 where the front flange opening 130*a* is located is pressed against the positioning portion 20A and the positioning portion 20B of the front housing 20.

In the example of FIG. 3, a pair of positioning portions 20A and 20B are shown, but one or more positioning portions may be provided on the inner wall surface of the front housing 20 to correspond to each side that defines the shape of the end surface of the flange 130 where the front flange opening 130*a* is located. Conversely, the portion that functions as a positioning portion may be only the positioning portion 20A or only the positioning portion 20B. In a case where the portion that functions as a positioning portion is one of the positioning portions 20A and 20B, in the ferrule assembly 100 with the flange 130 biased by the spring material 140, a state in which the tip end of the ferrule 110 and the rear portion of the sleeve 120 move in opposite directions with the contact point between the flange 130 and the portion that functions as the positioning portion as a fulcrum is realized. In this state, the external force that is applied to the biased ferrule assembly 100 is only the external force that is applied to the flange 130. The external force does not include a biasing force from the spring material 140.

Next, the adapter 600 to which the optical connector 10 is mounted has a first adapter opening 600*a* into which the front end portion of a mating optical connector is inserted and a second adapter opening 600*b* into which the front end portion of the optical connector 10 is inserted. Furthermore, the adapter 600 accommodates an alignment sleeve 700, which is a split sleeve, and a sleeve holder 710 that holds the alignment sleeve 700. After the front end portion of the optical connector 10 is completely inserted into the second adapter opening 600*b* of the adapter 600, that is, after the ferrule 110 is inserted into the alignment sleeve 700, when the ferrule of the mating optical connector is inserted into the alignment sleeve 700 via the first adapter opening 600*a*, the ferrule assembly 100 within the optical connector 10 is in a flange-back state. That is, the ferrule assembly 100 is retracted within the housing of the optical connector 10. As a result, the ferrule assembly 100 is in a floating state in which the ferrule assembly 100 is installed away from the inner wall surface of the optical connector 10 while the ferrule assembly 100 is in a biased state.

The lower part of FIG. 3 shows the positional relationship immediately before the ferrule 110 of the optical connector 10 is inserted into the alignment sleeve 700 within the adapter 600. As shown in FIG. 3, the ferrule assembly 100 is rotatable about the central axis of the ferrule 110 in the direction indicated by arrow S1 and is displaceable in the directions indicated by both arrow S2 and arrow S3. As shown in the figure, it is ideal that the central axis of the alignment sleeve 700 and the central axis of the ferrule 110 coincide with each other, but in reality, due to the internal structure of the optical connector 10 and the like, the axes are in an axis misalignment state as shown in FIGS. 4 and 5 which will be described below.

Figure 4:
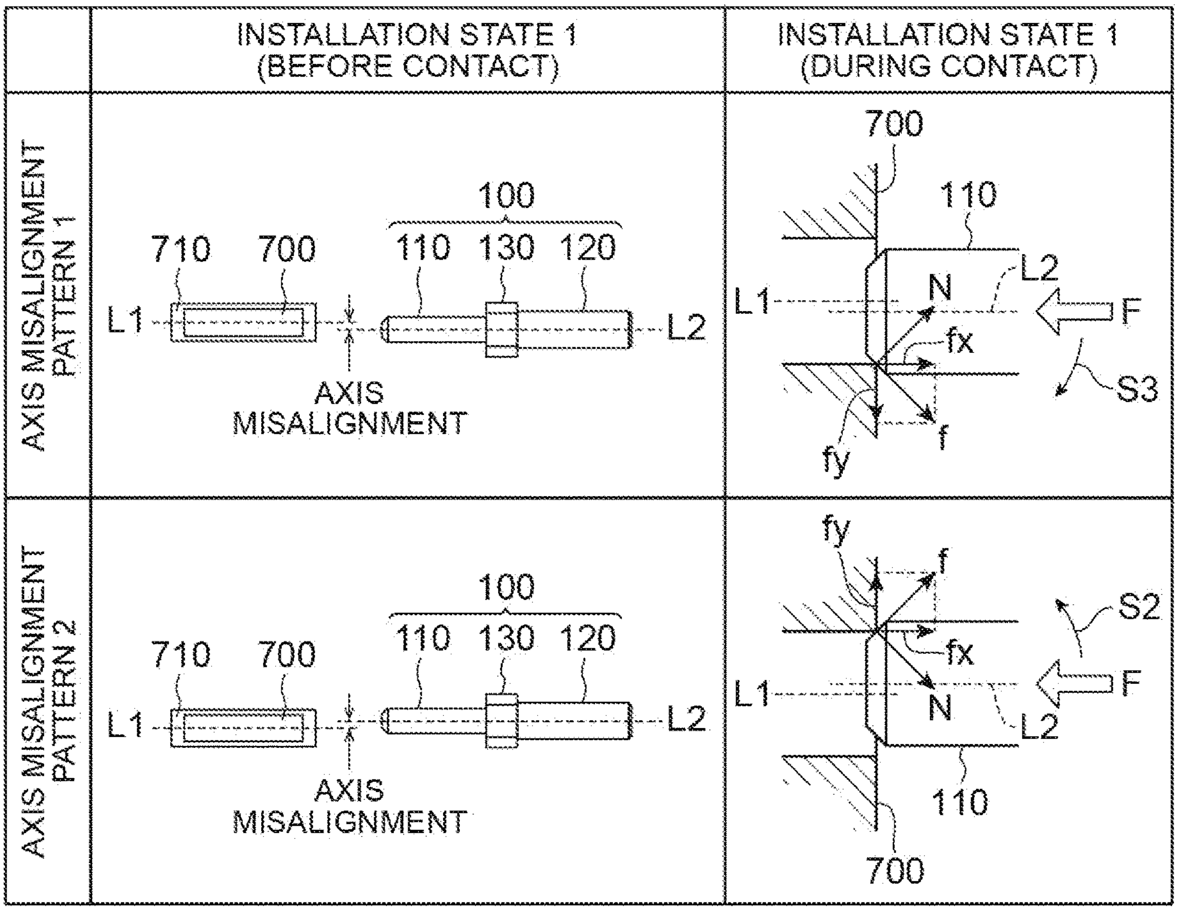
FIG. 4 is a view for explaining installation states of main parts before contact and during contact in a first installation state showing an axis misalignment between the ferrule assembly and the alignment sleeve, which are the main parts of the optical connection component of the present disclosure.

FIG. 4 is a view for explaining installation states of main parts before contact and during contact in a first installation state showing an axis misalignment between the ferrule assembly and the alignment sleeve, which are the main parts of the optical connection component of the present disclosure. FIG. 5 is a view for explaining installation states of the main parts before contact and during contact in a second installation state showing an angle misalignment between the ferrule assembly and the alignment sleeve, which are the main parts of the optical connection component of the present disclosure. FIG. 6 is a view for explaining a mounting operation of the main parts of the optical connection component of the present disclosure after contact.

In FIG. 4, the first installation state before contact is indicated as "installation state 1 (before contact)," and the first installation state during contact is indicated as "installation state 1 (during contact)." In addition, an upper part of FIG. 4 (indicated as "axis misalignment pattern 1" in FIG. 4) shows the state immediately before the ferrule 110 of the optical connector 10 is inserted into the alignment sleeve 700 in the adapter 600, that is, the state before contact in which the central axis of the ferrule 110 is shifted downward with respect to the central axis of the alignment sleeve 700 of the adapter 600, and a change in the installation state during contact. A lower part of FIG. 4 (indicated as "axis misalignment pattern 2" in FIG. 4) shows the state immediately before the ferrule 110 of the optical connector 10 is inserted into the alignment sleeve 700 in the adapter 600, that is, the state before contact in which the central axis of the ferrule 110 is shifted upward with respect to the central axis of the alignment sleeve 700 of the adapter 600, and a change in the installation state during contact.

Figure 5:
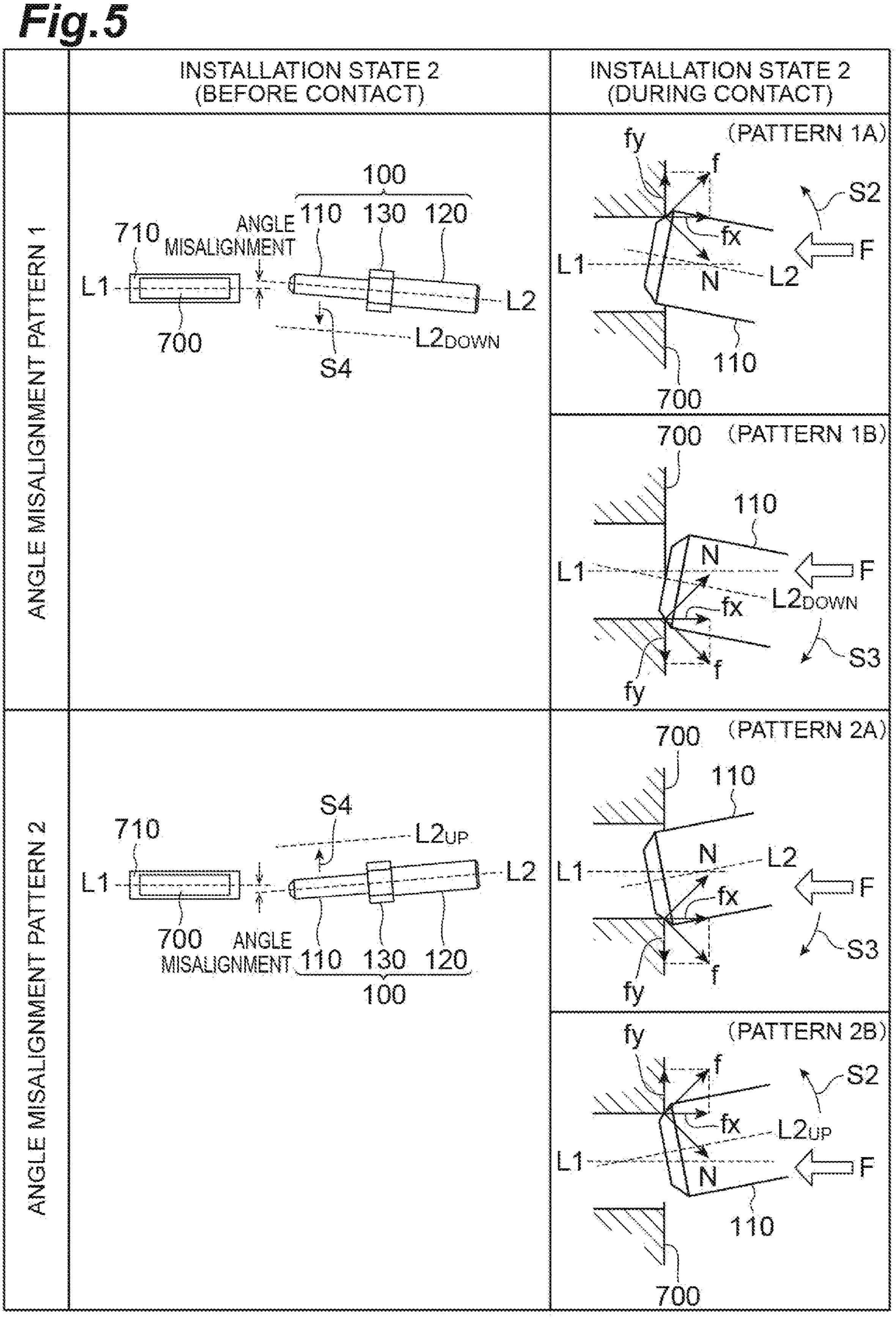
FIG. 5 is a view for explaining installation states of the main parts before contact and during contact in a second installation state showing an angle misalignment between the ferrule assembly and the alignment sleeve, which are the main parts of the optical connection component of the present disclosure.
Figure 6:
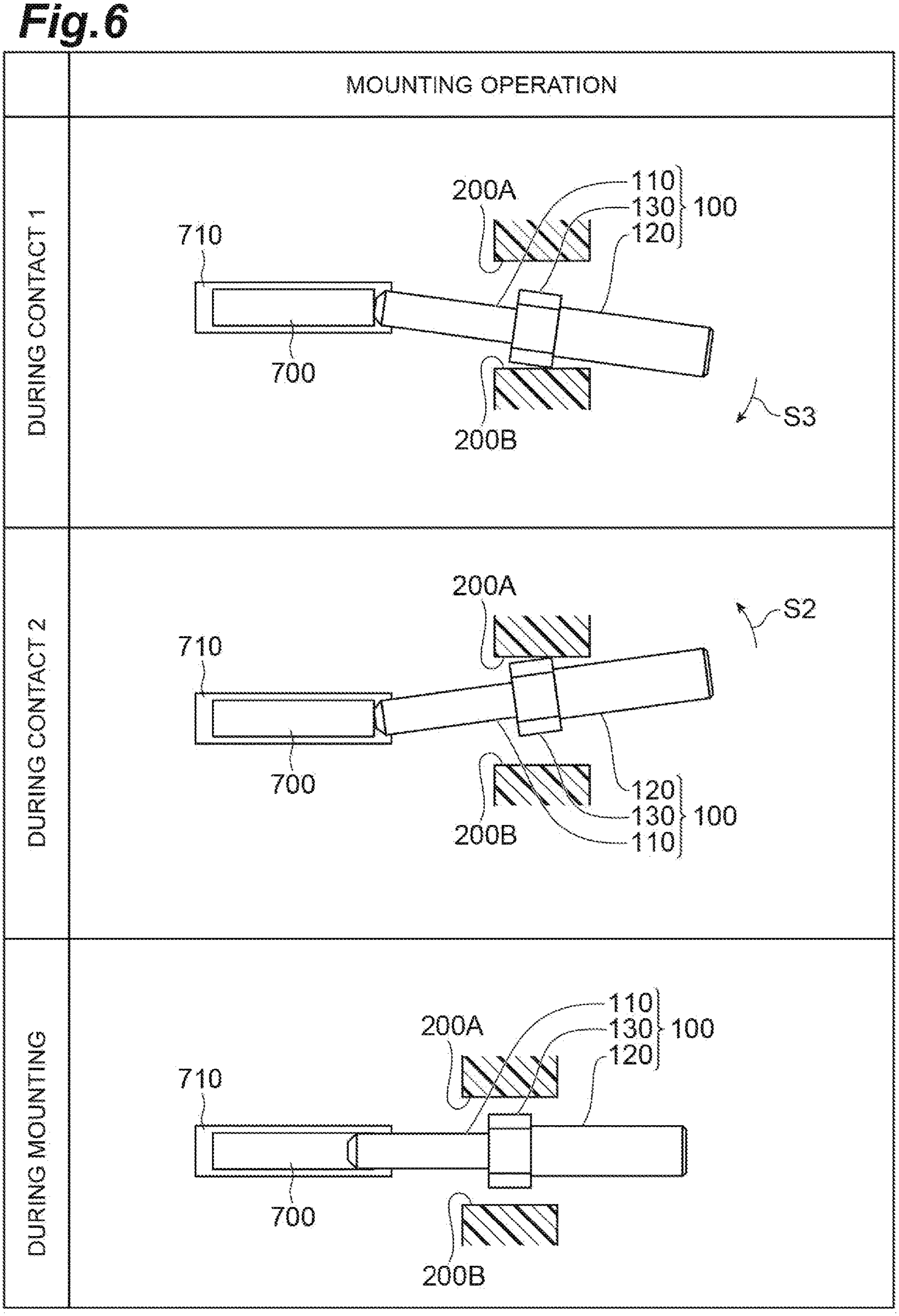
FIG. 6 is a view for explaining a mounting operation of the main parts of the optical connection component of the present disclosure after contact.

In FIG. 5, the second installation state before contact is indicated as "installation state 2 (before contact)," and the second installation state during contact is indicated as "installation state 2 (during contact)." In addition, an upper part of FIG. 5 (indicated as "angle misalignment pattern 1" in FIG. 5) shows the state immediately before the ferrule 110 of the optical connector 10 is inserted into the alignment sleeve 700 in the adapter 600, that is, the state before contact in which the central axis of the ferrule 110 is inclined downward at a predetermined angle with respect to the central axis of the alignment sleeve 700 of the adapter 600, and a change in the installation state during contact. A lower part of FIG. 5 (indicated as "angle misalignment pattern 2" in FIG. 5) shows the state immediately before the ferrule 110 of the optical connector 10 is inserted into the alignment sleeve 700 in the adapter 600, that is, the state before contact in which the central axis of the ferrule 110 is inclined upward at a predetermined angle with respect to the central axis of the alignment sleeve 700 of the adapter 600, and a change in the installation state during contact.

In addition, an upper part of FIG. 6 (indicated as "during contact 1" in FIG. 6) and a middle part (indicated as "during contact 2" in FIG. 6) shows examples of the installation states during contact shown in the first installation state (FIG. 4) and the second installation state (FIG. 5). A lower part of FIG. 6 (indicated as "during contact" in FIG. 6) shows the installation state of the ferrule assembly 100 in which the ferrule 110 is inserted into the alignment sleeve 700.

As shown in axis misalignment pattern 1 in the upper part of FIG. 4, in a state in which the central axis L2 of the ferrule 110 is shifted downward with respect to the central axis L1 of the alignment sleeve 700 or the sleeve holder 710 of the adapter 600 (before contact), when the tip end of the ferrule 110 that receives a biasing force F comes into contact with the alignment sleeve 700 or the sleeve holder 710, the ferrule 110 receives a frictional force f from the alignment sleeve 700. The frictional force f is obtained by multiplying a normal force N from the alignment sleeve 700 that the ferrule 110 receives and a coefficient of dynamic friction. The frictional force f is a composite force of a frictional force component $f_x$ parallel to the central axis of the ferrule 110 and a frictional force component $f_y$ perpendicular to the central axis. For this reason, the frictional force component $f_y$ that the ferrule 110 receives displaces the rear end portion of the ferrule assembly 100, that is, a side of the rear sleeve opening 120*b* of the sleeve 120, in the direction indicated by arrow S3. This state corresponds to during contact 1 shown in the upper part of FIG. 6. At this time, rotational positioning of the ferrule 110 is achieved by the flange 130 coming into contact with the flat surface 200B.

As shown in axis misalignment pattern 2 in the lower part of FIG. 4, in a state of before contact in which the central axis L2 of the ferrule 110 is shifted upward with respect to the central axis L1 of the alignment sleeve 700 or the sleeve holder 710 of the adapter 600, when the tip end of the ferrule 110 that receives a biasing force F comes into contact with the alignment sleeve 700 or the sleeve holder 710, the rear end portion of the ferrule assembly 100 is displaced toward the upper side with which the tip end of the ferrule 110 is brought into contact in the direction indicated by arrow S2. This state corresponds to during contact 2 in the middle part of FIG. 6. At this time, rotational positioning of the ferrule 110 is achieved by the flange 130 coming into contact with the flat surface 200A.

In angle misalignment pattern 1 shown in the upper part of FIG. 5, in pattern 1A in which the tip end of the ferrule 110 is brought into contact with the upper side of the opening end of the alignment sleeve 700 such that the central axis L1 of the alignment sleeve 700 and the central axis L2 of the ferrule 110 intersect with each other, the rear end portion of the ferrule assembly 100 is displaced toward the upper side with which the tip end of the ferrule 110 is brought into contact in the direction indicated by arrow S2. This state corresponds to during contact 2 in the middle part of FIG. 6. On the other hand, in pattern 1B in which the tip end of the ferrule 110 is brought into contact with the lower side of the opening end of the alignment sleeve 700 such that the central axis L1 of the alignment sleeve 700 and the central axis $L2_{DOWN}$ of the ferrule 110 intersect with each other, the rear end portion of the ferrule assembly 100 is displaced toward the lower side with which the tip end of the ferrule 110 is brought into contact in the direction indicated by arrow S3. This state corresponds to during contact 1 in the upper part of FIG. 6.

Furthermore, in angle misalignment pattern 2 shown in the lower part of FIG. 5, in pattern 2A in which the tip end of the ferrule 110 is brought into contact with the lower side of the opening end of the alignment sleeve 700 such that the central axis L1 of the alignment sleeve 700 and the central axis L2 of the ferrule 110 intersect with each other, the rear end portion of the ferrule assembly 100 is displaced toward the lower side with which the tip end of the ferrule 110 is brought into contact in the direction indicated by arrow S3. This state corresponds to during contact 1 in the upper part of FIG. 6. On the other hand, in pattern 2B in which the tip end of the ferrule 110 is brought into contact with the upper side of the opening end of the alignment sleeve 700 such that the central axis L1 of the alignment sleeve 700 and the central axis $L2_{UP}$ of the ferrule 110 intersect with each other, the rear end portion of the ferrule assembly 100 is displaced toward the upper side with which the tip end of the ferrule 110 is brought into contact in the direction indicated by arrow S2. This state corresponds to during contact 2 in the middle part of FIG. 6.

As described above, in both the patterns shown in FIGS. 4 and 5, rotational positioning of the ferrule 110 is achieved by the flange 130 coming into contact with the flat surface 200A or the flat surface 200B located on the side of the opening end of the alignment sleeve 700 with which the tip end portion of the ferrule 110 is brought into contact.

After the above mounting operation, the rotationally positioned ferrule assembly 100 is stably installed in the optical connector 10 by inserting the ferrule 110 into the alignment sleeve 700, as shown during mounting in the lower part of FIG. 6. In this way, the optical connection component of the present disclosure simultaneously realizes the rotational positioning and the floating structure of the ferrule 110. For this reason, the rotational positioning of the ferrule 110 can be realized without strict control of the clearance between the inner wall surface of the housing and the flange 130, and it is possible to improve the productivity of the optical connection component, especially the optical connector 10.

REFERENCE SIGNS LIST

10 . . . Optical connector
20 . . . Front housing
20A, 20B . . . Positioning portion
30 . . . Rear housing
40 . . . Boot
50 . . . Optical fiber
50A . . . MCF
50B . . . PMF
50C . . . bundle fiber

51, 51A, 51B, 51C, 510 . . . Glass fiber
52A, 52B, 520 . . . Core
53A, 53B . . . Common cladding
530 . . . Cladding
54 . . . Stress applying portion
100 . . . Ferrule assembly
110 . . . Ferrule
120 . . . Sleeve
120*a* . . . Front sleeve opening
120*b* . . . Rear sleeve opening
130 . . . Flange
550 . . . Integrated holding portion
130*a* . . . Front flange opening
130*b* . . . Rear flange opening
140 . . . Spring material
200A, 200B . . . Flat surface
600 . . . Adapter
600*a* . . . First adapter opening
600*b* . . . Second adapter opening
700 . . . Alignment sleeve
710 . . . Sleeve holder
$L_A$, $L_R$ . . . Line

The invention claimed is:

1. An optical connection component comprising:

an optical connector having an optical fiber that includes a glass fiber and a resin coating which covers the glass fiber, a front end portion, and a rear end portion located on a side opposite to the front end portion; and an adapter having an opening that accommodates the front end portion of the optical connector, an alignment sleeve, and a sleeve holder that holds the alignment sleeve in a predetermined position, wherein the optical connector includes:

a ferrule assembly having a ferrule fixed to a tip end portion of the glass fiber exposed from the resin coating of the optical fiber and a holding portion to which a rear end portion of the ferrule is fixed and which is provided with a flange;

a housing having an inner wall surface that defines an internal space in which at least the holding portion of the ferrule assembly is accommodated, a flat surface that constitutes a part of the inner wall surface and is provided at a position facing a part of an outer peripheral surface of the flange, and a positioning portion that limits movement of the holding portion in the internal space; and an elastic member that biases the flange toward the positioning portion, wherein, in a state in which a front end portion of the ferrule and the alignment sleeve or the sleeve holder in the adapter are not in contact with each other, the flange is biased toward the positioning portion to be rotatable about a first central axis of the ferrule, such that, in an axis misalignment state, the first central axis of the ferrule is displaced with respect to a central axis of the alignment sleeve in a direction perpendicular to the central axis of the alignment sleeve while the first central axis of the ferrule and the central axis of the alignment sleeve are parallel to each other, and wherein, in the axis misalignment state in which the front end portion of the ferrule and the alignment sleeve or the sleeve holder in the adapter are in contact with each other, and the outer peripheral surface of the flange is in contact with the flat surface, and the flange is biased toward the positioning portion.

2. The optical connection component according to claim 1, wherein the optical connector has a floating structure, and wherein, in the floating structure, an installation position of the ferrule assembly in the housing changes as the ferrule is pushed from the front end portion toward the rear end portion of the optical connector.

3. The optical connection component according to claim 1, wherein an outer shape of the flange of the holding portion is quadrangular when the flange is viewed from the front end portion toward the rear end portion of the optical connector.

4. The optical connection component according to claim 3, wherein a pair of corners with at least one of opposing sides of the outer shape interposed therebetween are curved.

5. The optical connection component according to claim 1, wherein the optical fiber is any one of a multi-core optical fiber, a polarization-maintaining optical fiber, and a bundle fiber.

6. The optical connection component according to claim 1, wherein the housing of the optical connector is comprised of a resin.

7. The optical connection component according to claim 1, wherein the flange of the holding portion is comprised of a metal.

8. The optical connection component according to claim 1, wherein the flange of the holding portion is comprised of a resin.

9. An optical connection component comprising:

an optical connector having an optical fiber, a ferrule assembly, a housing, and an elastic member; and an adapter having an opening, an alignment sleeve, and a sleeve holder, wherein the optical connector further includes a front end portion and a rear end portion located on a side opposite to the front end portion, wherein the optical fiber includes a glass fiber and a resin coating which covers the glass fiber, wherein the ferrule assembly includes a ferrule fixed to a tip end portion of the glass fiber exposed from the resin coating and a holding portion to which a rear end portion of the ferrule is fixed and which is provided with a flange, wherein the housing includes an inner wall surface that defines an internal space in which the holding portion is accommodated, a flat surface that constitutes a part of the inner wall surface and is provided at a position facing a part of an outer peripheral surface of the flange, and a positioning portion for limiting movement of the holding portion in the internal space, wherein the elastic member biases the flange toward the positioning portion, wherein the opening accommodates the front end portion of the optical connector, wherein the sleeve holder holds the alignment sleeve in a predetermined position, and wherein, in a state in which a front end portion of the ferrule and the alignment sleeve or the sleeve holder in the adapter are not in contact with each other, the flange is biased toward the positioning portion to be rotatable about a first central axis of the ferrule, such that, in an axis misalignment state, the first central axis of the ferrule is displaced with respect to a central axis of the alignment sleeve in a direction perpendicular to the central axis of the alignment sleeve while the first central axis of the ferrule and the central axis of the alignment sleeve are parallel to each other.

10. An optical connection component comprising:

an optical connector having an optical fiber, a ferrule assembly, a housing, and an elastic member; and an adapter having an opening, an alignment sleeve, and a sleeve holder, wherein the optical connector further includes a front end portion and a rear end portion located on a side opposite to the front end portion, wherein the optical fiber includes a glass fiber and a resin coating which covers the glass fiber, wherein the ferrule assembly includes a ferrule fixed to a tip end portion of the glass fiber exposed from the resin coating and a holding portion to which a rear end portion of the ferrule is fixed and which is provided with a flange, wherein the housing includes an inner wall surface that defines an internal space in which the holding portion is accommodated, a flat surface that constitutes a part of the inner wall surface and is provided at a position facing a part of an outer peripheral surface of the flange, and a positioning portion for limiting movement of the holding portion in the internal space, wherein the elastic member biases the flange toward the positioning portion, wherein the opening accommodates the front end portion of the optical connector, wherein the sleeve holder holds the alignment sleeve in a predetermined position, and wherein, in an axis misalignment state, when a front end portion of the female and the alignment sleeve or the sleeve holder in the adapter are not in contact with each other, a first central axis of the ferrule is displaced with respect to a central axis of the alignment sleeve in a direction perpendicular to the central axis of the alignment sleeve while the first central axis of the ferrule and the central axis of the alignment sleeve are parallel to each other, in the axis misalignment state in which the front end portion of the ferrule and the alignment sleeve or the sleeve holder in the adapter are in contact with each other, the outer peripheral surface of the flange is in contact with the flat surface, and the flange is biased toward the positioning portion.

11. The optical connection component according to claim 1, wherein, in an angle misalignment state, the first central axis of the ferrule is displaced with respect to the central axis of the alignment sleeve so that the first central axis of the ferrule extends along a line that intersects with the central axis of the sleeve, and in the angle misalignment state, in which the front end portion of the ferrule and the alignment sleeve or the sleeve holder in the adapter are in contact with each other, the outer peripheral surface of the flange is in contact with the flat surface, and the flange is biased toward the positioning portion.

* * * * *